DIGITALLY CONTROLLED FREQUENCY SYNTHESIZER

Filed Aug. 26, 1966 3 Sheets-Sheet 1

INVENTOR
RODGER A. CLIFF

BY

ATTORNEYS

INVENTOR
RODGER A. CLIFF

BY [signature]
ATTORNEYS

INVENTOR
RODGER A. CLIFF

BY [signature] [signature]
ATTORNEYS 3,464,018
DIGITALLY CONTROLLED FREQUENCY SYNTHESIZER Rodger A. Cliff, College Park, Md., assignor to the United States of America as represented by the Administrator of the National Aeronautics and Space Administration Filed Aug. 26, 1966, Ser. No. 576,183
Int. Cl. H03k 3/02
U.S. Cl. 328—61 3 Claims

ABSTRACT OF THE DISCLOSURE

A digital oscillator wherein a clock drives a first binary counter and associated logic gates to produce a number of pulse trains which are selectively gated through the logic gates, combined and supplied to a frequency divider to produce a square wave signal having a constant fundamental component proportional to the mean pulse rate of the combined pulse train, and wherein a second binary counter responsive to the first periodically resets the frequency divider.

The invention described herein was made by an employee of the United States Government and may be manufactured and used by or for the Government for governmental purposes without the payment of any royalties thereon or therefor.

This invention relates generally to frequency synthesizers, and more particularly to digitally controlled frequency synthesizers of the type known as digital oscillators. Such apparatus may be used in pulse frequency modulation (PFM) telemetry systems to produce a number of discrete frequencies which are transmitted serially in accordance with the format of a telemetry data frame. These discrete frequencies are detected at a remote point by a bank of contiguous bandpass filters or a bank of correlators.

Present types of digital oscillators from PFM telemetry systems utilize magnetic core oscillators, and provide output frequencies that are only approximately known. The output frequencies of such oscillators may drift, either separately or together. This characteristic makes it difficult to detect exactly at which frequency the output is occurring under conditions of poor signal-to-noise ratio. In addition, prior art digital oscillators are limited, because of practical design conditions, in the number of discrete frequencies that may be generated. Typically this limit is $2^4$ bits, or 16 messages. A digital oscillator producing a larger number of discrete frequencies is desirable in that greater coding gain is possible, and therefore a worse signal-to-noise ratio may be tolerated.

It is further desirable for the digital oscillator to provide output signals that are closely controlled as to phase and frequency so that correlation detectors may be used in processing the received signal. Preferably, each output signal should be made to have either one of two distinct phases which may be distinguished by correlation detection; that is, having outputs that form bi-orthogonal sets.

It is, therefore, among the objects of the present invention to provide a new and improved digital oscillator for use with pulse frequency modulation (PFM) systems.

Another object of the invention is to provide a digital oscillator which generates a large number of discrete frequencies within a PFM telemetry format.

A still another object of the present invention is to provide a digital oscillator capable of providing a large number of discrete frequencies which are controlled as to phase and frequency.

Yet another object of the present invention is to provide a digital oscillator in which all output frequencies are derived from a single stable oscillator.

A further object of the present invention is to provide a digital oscillator which produces orthogonal or bi-orthogonal outputs suitable for use with correlation detection techniques.

Another object of the present invention is to provide a digital oscillator which will always produce a fixed number of cycles during telemetry burst, with a fixed phase between the beginning of the burst and the first cycle thereof.

The digital oscillator of the present invention includes a common fixed frequency signal source (or clock) which drives a first binary counter and several logic gates. The first counter produces a number of pulse trains (one pulse train for each stage) having repetition rates related by the powers of 2, and characterized in that no pulses in any of the pulse trains occur simultaneously. The pulse trains are selectively gated through the logic gates to a combining or summing circuit. The logic gates may be controlled by a binary number, as for example, binary digits stored in an accumulator. In any given time interval the resulting combined pulse train will contain a number of pulses equal to the sum of the number of pulses in individual ones of the pulse trains selectively gated through the logic gates to the combining circuit.

The resulting combined pulse train drives a second binary counter. The first stage of the second counter generates a square wave, irregular in width, in response to the combined pulse train, and the subsequent stages of the second counter produce similar (irregular) square waves that have been divided down in frequency. As a result, the average period of the irregular square wave is increased by dividing down through several stages of the second binary counter, while the absolute deviation in width of each pulse in the square wave remains the same. Accordingly, the percent deviation, or relative period deviation error between half-cycles of the square wave, is reduced to a negligible amount. In this manner, it is possible, to the accuracy of a single stable oscillator, to generate a large number of discrete frequencies, linearly related to the binary input number.

A third binary counter, responsive to the first, drives a burst-blank control circuit which generates a burst-blank envelope for periodically resetting the second counter. This provides output signals of a constant number of cycles independent of frequency drift in the clock, that begin at a predetermined time and with a predetermined phase relationship.

The various features and attendant advantages of the invention will become readily apparent from the following description when taken in conjunction with the accompanying drawings, in which.

Figure 1:
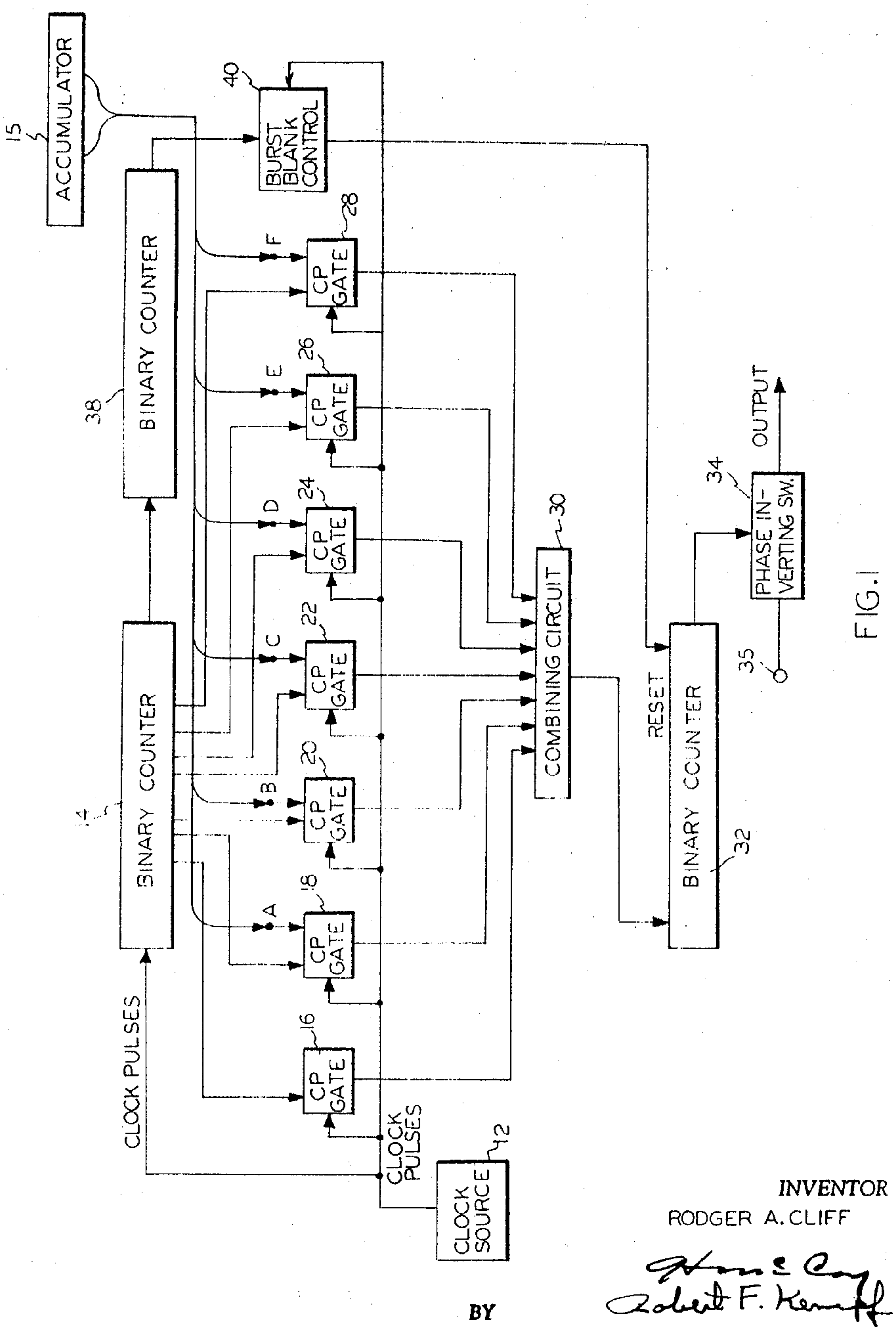
FIGURE 1 is a block diagram of a digital oscillator according to a particular embodiment of the invention.

Referring now to the specific embodiment of the invention, in FIGURE 1 clock source 12 supplies clock pulses of a stable fixed frequency to the input of binary counter 14. Clock source 12 may be any stable pulse source capable of producing a pulse train of a fixed frequency, such as the clock source commonly used for timing pulses in telemetry systems. Counter 14 may be any multistage binary counter of the usual type wherein a series of interconnected bistable elements such as flip-flops change state in sequence in response to an input pulse train. Typically, although not limiting, counter 14 may be a "ripple-through" type counter and may utilize SN510/511 reset-set flip-flop counter networks supplied by Texas Instruments, Inc., Dallas, Tex., or the equivalent. Any number of stages may be used for counter 14, with seven stages being representatively shown in the illustrated embodiment of FIGURE 1.

A square wave output from each stage of binary counter 14 is coupled to one of clock pulse gates 16, 18, 20, 22, 24, 26, and 28, there being one gate for each stage of counter 14. Because of the count-down action of counter 14, the square wave output of each stage is divided down in frequency by a factor of 2 with respect to the output of the previous stage. In the present illustrative embodiment it is assumed that a positive voltage (the positive half-cycle of a square wave) represents a logical "1," and the absence of a voltage (the negative half-cycle of a square wave) represents a logical "0." Each flip-flop (or stage) of counter 14 has two outputs—a Q output denoting the "true" output and a $\overline{Q}$ output denoting the "false" output. Thus the stages of counter 14 are interconnected such that their Q outputs follow a logic sequence known as a "pure binary code." It is to be understood, however, that other logic conventions and circuit arrangements capable of performing the functions of counter 14 may be utilized.

Each gate 16, 18, 20, 22, 24, 26 and 28 also receive as a further input, clock pulses from clock pulse source 12. There is also provided additional input terminals for selected ones of these clock pulse gates, such as terminals A–F, respectively. As will be subsequently discussed these input terminals may be coupled to an accumulator 15 or related device with which the digital oscillator is to be utilized.

The function of clock pulse gates 16, 18, 20, 22, 24, 26 and 28 is to produce pulse trains in response to the square wave outputs of corresponding stages of counter 14. The gating action is such that no pulses in any pulse train occur simultaneously; for example, a pulse occurs in the output of gate 16 for every 0 to 1 transition in the Q output of the first stage of counter 14, a pulse occurs in the output of gate 18 for every 0 to 1 transition in the Q output of the second stage of counter 14, and so on. Any gating or differentiating arrangement capable of performing this function may be utilized. An illustrated example of one such arrangement will be subsequently described.

The pulse trains derived from the outputs of gates 16, 18, 20, 22, 24, 26 and 28 are supplied to combining circuit 30, which circuit may be multiple-input NOR gate. Accordingly, the pulse trains from clock pulse gates 16, 18, 20, 22, 24, 26 and 28 are combined in a "logical or" fashion such that in any time interval the resulting pulse train out of the combining circuit 30 will have a number of pulses equal to the sum of the number of pulses in the selected pulse trains derived from the clock pulse gates.

The output of combining circuit 30 is applied as an input to the first stage of binary counter 32. This counter may be of the same configuration as binary counter 14. The output from the final stage of the counter 32, divided in frequency because of the count-down action of its successive stages, is coupled to phase inverting switch 34. Switch 34, in turn, functions to invert the phase of the square wave derived from the output stage of counter 32 in response to a signal applied to control terminal 35. Any circuit capable of performing this function may be utilized, with an illustrated example of one such circuit to be subsequently described.

It is also desirable in PFM telemetry systems to provide a digital oscillator that will produce a fixed number of cycles during a selected "burst" interval. To this end the output of counter 14 is coupled to a further binary counter 38, which counter may be essentially the same type as counters 14 and 20. The output of the several stages of counter 38 is applied to burst-blank control circuit 40, with burst-blank control circuit 40 providing a control pulse of predetermined length for the resetting of counter 32. This enables counter 32 to be periodically reset so that the number of cycles per burst of the output of the digital oscillator of FIGURE 1 is fixed and begins at a predetermined time and with a predetermined phase. An illustrated example of circuitry to perform this function is subsequently described in more detail in conjunction with FIGURE 7.

Figures 2, 3, 4:
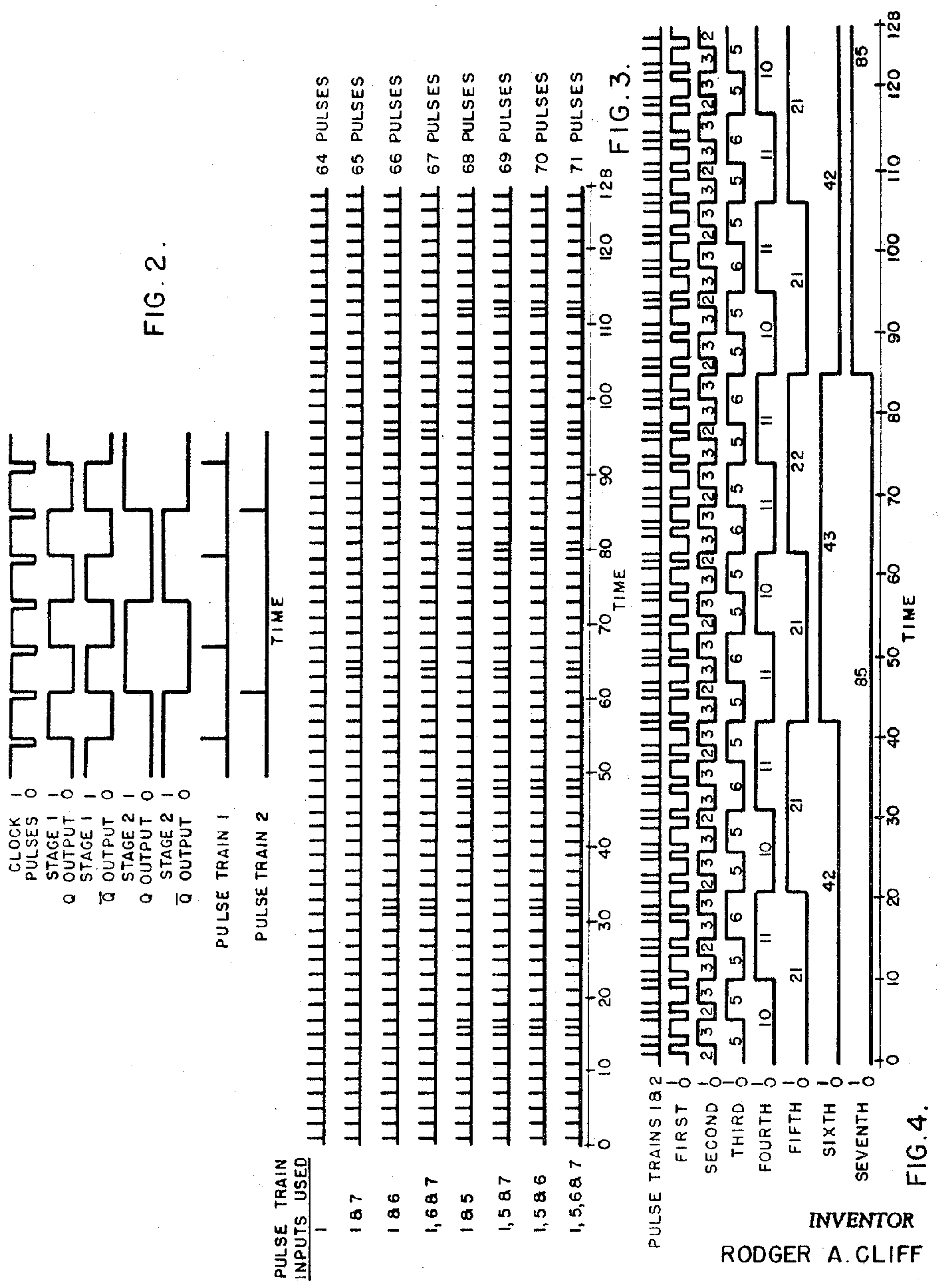
FIGURES 2–4 are a series of waveforms useful in understanding the operation of the digital oscillator of FIGURE 1.

The operation of the digital oscillator of FIGURE 1 may be best understood in conjunction with the waveforms of FIGURES 2–4. FIGURE 2 illustrates the output waveforms from stages of counter 14 and the pulse trains derived therefrom. FIGURES 3 and 4 represent pulse trains derived from combining circuit 30 and square wave appearing at various stages of counter 32, respectively. The waveforms of FIGURE 2 are shown for an arbitrary time base, while the respective pulse trains or square waves of FIGURES 3 and 4 are given as a function of time in terms of clock period intervals.

Turning now to the waveforms of FIGURE 2, it can be seen that the Q outputs of the second stage of counter 14 produces a square wave having a repetition rate one-half that of the first stage. Similarly, each subsequent stage has a square wave output with a repetition rate one-half that of the preceding stage. In addition, the $\overline{Q}$ output of each stage is a square wave having the same repetition rate as the Q output of that stage, but with phase inversion. Waveforms as illustrated may be generated, for example, by triggering the first stage of counter 14 with a positive-going transition of the clock pulses and by triggering the subsequent stages with the positive-going transition of the $\overline{Q}$ output of the preceding stage.

FIGURE 2 also shows the relationship of the pulse trains out of the gates associated with each stage of counter 14. Pulse trains 1 and 2, associated with stages 1 and 2 of counter 14, are illustrated. It may be seen that a pulse occurs in pulse train 1 for every 0 to 1 transition in the Q output of the first stage of counter 14, a pulse in pulse train 2 for every 0 to 1 transition in the Q output of stage 2, and so on. The width of the pulses in these pulse trains may be determined by the width of the clock pulses which are also applied to the gates. In addition, a pulse train will be derived from a gate only with an appropriate control signal (binary 1 or binary 0) applied to terminals A–F of FIGURE 1.

Considering the overall count-down action of counter 14 in the illustrative embodiment of FIGURE 1, for an assumed 128 clock periods, pulse train 1 (from gate 16) has 64 pulses, pulse train 2 (from gate 18) has 32 pulses, pulse train 3 (from gate 20) has 16 pulses, pulse train 4 (from gate 22) has 8 pulses, pulse train 5 (from gate 24) has 4 pulses, pulse train 6 (from gate 26) has 2 pulses and pulse train 7 (from gate 28) has 1 pulse. Various ones of these pulse trains, combined with pulse train 1 are shown in FIGURE 3 to illustrate eight different pulse trains having 64 to 71 pulses (per 128 clock periods) as appear at the output of combining circuit 30. It is to be noted that whenever a pulse train is added to pulse train 1, the spacing between the added pulse and adjacent pulses is one-half that of the normal spacing of pulses in pulse train 1. This results in a pulse train out of combining circuit 30 with a somewhat irregular pulse spacing.

The pulse train from combining network 30 will toggle the first stage of counter 32 to produce the first square wave of FIGURE 4. The combined pulse trains 1 and 2 are shown in FIGURE 4 for convenience of illustration, it being understood that the same principles would apply to the combined pulse trains of FIGURE 3 or any other combination of pulse trains. Because of the irregular spacing between pulses of the combined pulse train some half-cycles of the output of the first stage of counter 32 are only half as long as others. The remaining square waves of FIGURE 4 represent the output of the second through seventh stages of counter 32. Although this repeated action of dividing down produces output square waves which are somewhat irregular, the relative irregularity is reduced by each stage. Thus as seen in FIGURE 4 the relative difference in pulse width arising from the combined pulse trains becomes less for each successive stage of counter 32. The result is shown in Table 1, below, where the percent deviation is computed using the mean period as a reference. It may be seen by Table 1 that although the average period is increased by dividing-down, the absolute deviation remains the same. Therefore, the relative error is reduced by each division such that it is negligible at the output of the final stage of counter 32.

TABLE 1

| Counter 32 stage No. | Max. ½ cycle length (clock periods) | Min. ½ cycle length (clock periods) | Average ½ cycle length (clock periods) | Max. positive period deviation, percent | Max. negative period deviation, percent |
|---|---|---|---|---|---|
| 1 | 2 | 1 | 1.333 | 49.5 | −24.8 |
| 2 | 3 | 2 | 2.666 | 12.4 | −24.8 |
| 3 | 6 | 5 | 5.333 | 12.4 | −6.2 |
| 4 | 11 | 10 | 10.666 | 3.1 | −6.2 |
| 5 | 22 | 21 | 21.333 | 3.1 | −1.5 |
| 6 | 43 | 42 | 42.666 | .8 | −1.5 |
| 7 | 86 | 85 | 85.333 | .8 | −.4 |

Figure 5:
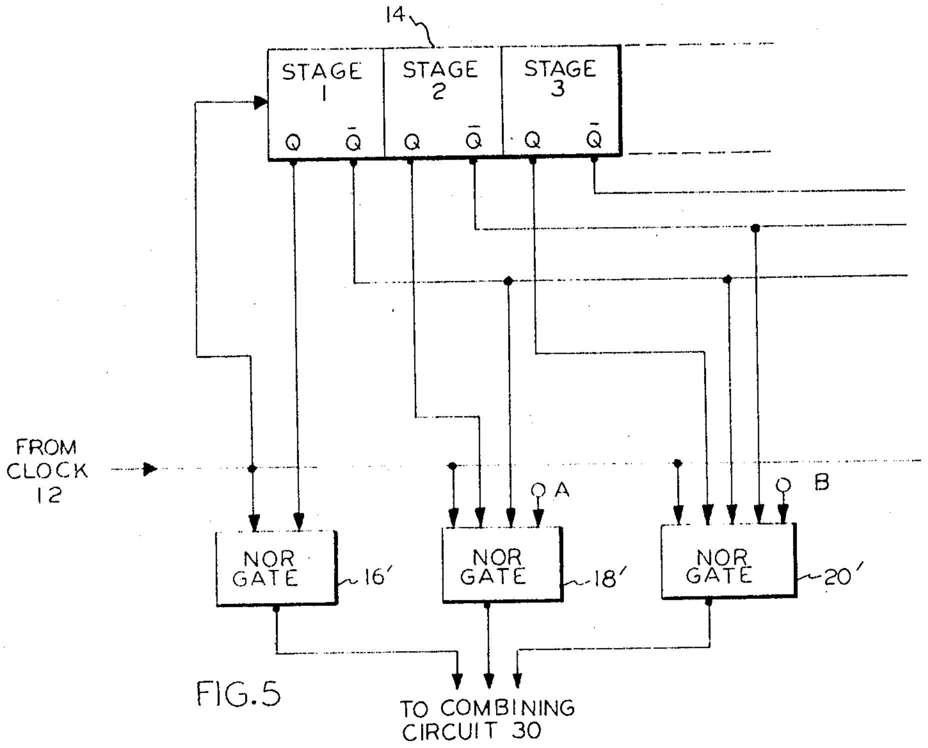
FIGURE 5 is a schematic representation of a more specific clock pulse gating arrangement which may be used in conjunction with the digital oscillator of FIGURE 1.

An illustrative example of more specific circuitry by which clock pulse gating may be achieved is shown in FIGURE 5. The gates responding to the first three stages of counter 14 are shown, it being understood that any number of stages and corresponding gates may be utilized. As has been noted, each stage of counter 14 may be a binary element such as a flip-flop and accordingly each stage has two outputs of inverse polarity, and are designated as Q and $\overline{Q}$ in accordance with the nomenclature previously discussed. Gates 16′, 18′, 20′, etc. (corresponding to gates 16, 18, 20, etc. of FIGURE 1) are NOR gates—for example, SN512 NOR/NAND gates supplied by Texas Instrument, Inc., Dallas, Tex., or the equivalent. Each gate 16′, 18′, 20′, etc., receives an input from clock source 12 and an input from the Q output corresponding stage of counter 14. In addition, the $\overline{Q}$ output of each counter stage is coupled to a further input of all subsequent successive gates (no such input being provided for gate 16′). Thus, as shown in FIGURE 5, the Q output of each one of counter stages 1, 2, 3, etc., is coupled to a corresponding input of one of gates 16′, 18′, 20′, etc. In addition, the $\overline{Q}$ output of counter stage 1 is coupled to further inputs of each of gates 18′, 20′, etc., the $\overline{Q}$ output of counter stage 2 to further inputs of each of gates 20′, etc., and so on.

With the foregoing arrangement, wherein NOR logic is utilized, and with a clock pulse of the waveform illustrated in FIGURE 2 and no input provided to control terminals A, B, etc., a pulse train will occur out of each clock pulse gate for each 0 to 1 transition in the Q output of its respective stage. By further applying digital signals in parallel to control terminals A, B, etc., such as may be derived from an accumulator or other device with which the digital oscillator of the invention is to be utilized, a a pulse train is derived only from selected ones of gates 18′, 20′, etc., depending on the data format used. It is to be understood that the utilization device such as accumulator 15 does not form part of the invention and is presented only as an illustrative example of intended use. It is readily apparent that the control signals applied in parallel to terminals A, B, etc., may have any selected data format and may be applied by either electronic or mechanical switching means to enable selected gates. When derived from an accumulator comprised of several binary stages, for example, the signals applied to terminals A, B, etc., may be derived from whatever stages produce the desired result and applied in parallel to terminals A, B, etc. With the NOR logic utilized in the manner illustrated in FIGURE 5, a pulse train will occur for logical 0—the absence of a voltage on control terminals A, B, etc. Thus, for the embodiment described in conjunction with FIGURE 1, six input terminals (A–F) may be provided such that $2^6$ or 64 distinct frequencies are produced by appropriate combination of selected pulse trains.

The gate associated with a seventh stage of counter 14 (stage 1 and gate 16, producing pulse train 1 in the illustrative embodiment) preferably does not receive a control voltage and is maintained in a logical state that continuously produces a pulse train. This provides a base or reference frequency to which the above mentioned distinct frequencies may be added.

Figures 6, 7:
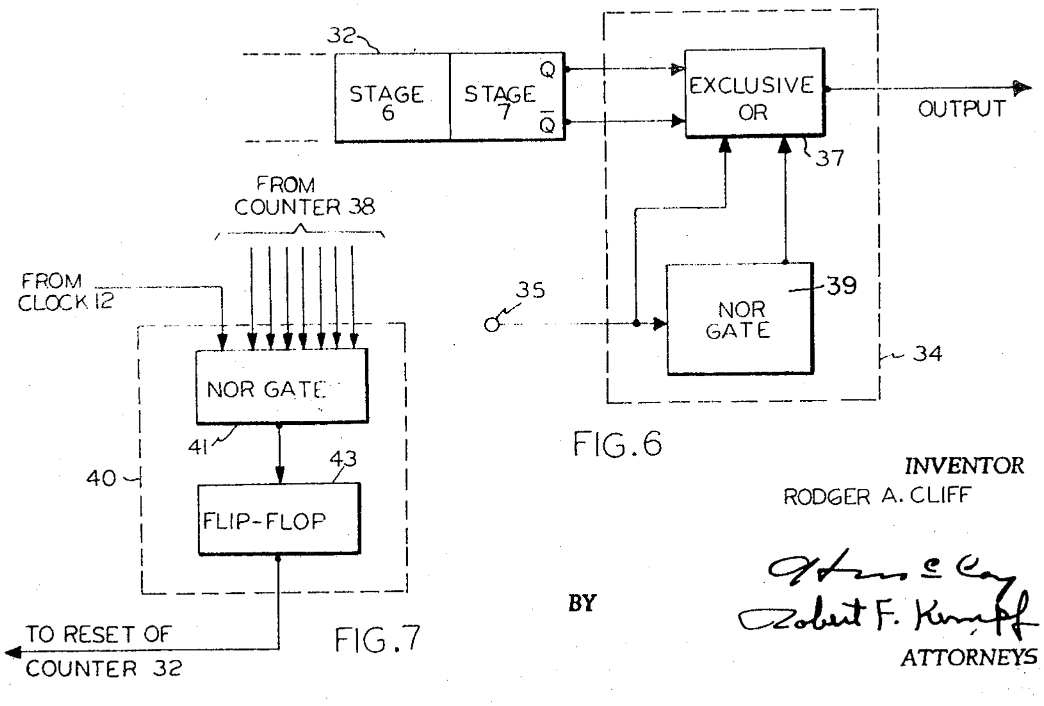
FIGURE 6 is a schematic representation of a polarity switch which may be used in conjunction with the digital oscillator of FIGURE 1.
FIGURE 7 is a schematic representation of a more specific manner in which burst-blank control may be achieved.

A representative example of phase inverting switch 34 is shown in FIGURE 6. This switch may take the form of an "Exclusive OR" logic network 37 (such as type SN515 supplied by Texas Instruments, Inc., Dallas, Tex., or the equivalent) operating in conjunction with NOR gate 39. Exclusive OR network 37 has two pairs of inputs, and an application of signals of a given logical state to such inputs will produce an output of a given phase. The function of the NOR gate is to provide phase inversion of the control signal applied to one input of a selected pair. With a signal applied to control terminal 35 (for example, logical 1) and with one input pair of Exclusive OR network 37 coupled to the Q and $\overline{Q}$ outputs of the final stage of counter 32, an output square wave of a given phase will be produced. Change of the control signal from 1 to 0 will cause phase reversal of the output square wave. Thus, the output square wave may have one of two phases.

An illustrated example of burst-blank control circuit 40 is shown in FIGURE 7. This circuit includes multiple-input NOR gate 41, with the output thereof coupled to flip-flop 43. NOR gate 41 receives one input from clock source 12 and further inputs from each stage of counter 38. These signals from counter 38 are all of the same phase, for example, the $\overline{Q}$ output from the stages of counter 38. The clock pulse coupled through NOR gate 41 toggles flip-flop 43. This corresponds in time with an output pulse produced by gate 16 in response to a 0 to 1 transition of the Q output of the first stage of counter 14. At the end of one cycle of counter 38 another clock pulse toggles flip-flop 43. Accordingly, the output of flip-flop 43 is a square wave, the half-period of which corresponds to a count cycle of counter 38.

The output of flip-flop 43 is applied to the reset input of counter 32. As a result counter 32 counts for one cycle of $2^{14}$ clock periods, is maintained in a reset condition for an equivalent period, counts for a further cycle, and so on. The count cycle provides a "burst" interval during which a square wave output is provided in accordance with a pulse train input, the reset period provides a "blank" interval during which there is no square wave output. Since the burst interval is generated in response to the same clock source as the pulse trains that are combined and processed by counter 32 to produce its output square wave, the number of cycles per burst will remain fixed, independent of frequency drift in the clock and will begin at a predetermined time and with a predetermined phase.

The invention provides, therefore, a digital oscillator capable of producing a large number of discrete frequencies, all derived from a single stable oscillator. A larger number of accurately controlled frequencies are obtainable than previously possible with prior art digital oscillators, thus enhancing the coding gain of the system. Burst-blank control is provided from the same single source so that for each single burst the number of cycles remains constant, independent of frequency drift in the clock. The output signals have one of two known, distinct phases—that is, the output may be a biorthogonal set. The digital oscillator of the invention is particularly useful where signals derived therefrom are to be recovered from noisy communication channels by correlation techniques.

Although a specific embodiment of the digital oscillator of the invention has been described with particularity, it is not to be limited to the specific circuit arrangements herein disclosed, and modifications and variations thereof should be obvious to those skilled in the art. For example, other types of elements may be used than those described and logic systems other than binary logic may be used. Where a larger number of discrete frequencies are desired than specified in the illustrated embodiment, synchronous counters rather than ripple-through counters may be used. It is therefore to be understood that within the scope of the appended claims the invention may be practiced otherwise than specifically set forth.

What is claimed is:

1. A digital oscillator comprising:
   - a signal source producing a first pulse signal of constant pulse rate;
   - a first multi-stage counter responsive to said first pulse signal for producing a plurality of pulse trains having a pulse rate differing from one another;
   - a plurality of gating circuits each responsive to said first pulse signal and to an output signal from a successive stage of said first counter, each said gating circuit producing a pulse train characterized in that no pulse in any pulse train occurs simultaneously with any pulse in any other pulse train; and individual ones of said gating circuits having an additional input terminal for receiving a control signal for selectively producing said pulse trains;
   - means for combining selected ones of said pulse trains to produce a single pulse train with a mean pulse rate equal to the sum of the pulse rates of the selected pulse trains; and
   - multi-stage frequency dividing means responsive to said single pulse train for producing a square wave signal having a constant fundamental frequency component proportional to the mean pulse rate of said single pulse train.

2. The digital oscillator of claim 1 and further including a second multi-stage counter responsive to said first multi-stage counter, and control means responsive to said second multi-stage counter for periodically resetting said frequency dividing means.

3. The apparatus of claim 2 wherein said control means responds to said second multi-stage counter to produce a square wave signal the half-period of which is equivalent to a count cycle of said second multi-stage counter.

References Cited

UNITED STATES PATENTS

| | | | |
|---|---|---|---|
| 3,036,223 | 5/1962 | Phillips | 328—39 XR |
| 3,184,663 | 5/1965 | Mergler | 328—41 XR |
| 3,263,174 | 7/1966 | Bjorkman et al. | 307—271 XR |

ARTHUR GAUSS, Primary Examiner

JOHN ZAZWORSKY, Assistant Examiner

U.S. Cl. X.R.

307—271; 328—14, 63, 187; 331—14